(12) United States Patent
Benicewicz et al.

(10) Patent No.: US 12,403,451 B2
(45) Date of Patent: Sep. 2, 2025

(54) SURFACE GRAFTED HIGH INTERNAL PHASE EMULSION FOAMS FOR CHEMICAL SEPARATIONS

(71) Applicants: University of South Carolina, Columbia, SC (US); Savannah River Nuclear Solutions, LLC, Aiken, SC (US)

(72) Inventors: Brian Benicewicz, Columbia, SC (US); Julia Pribyl, Columbia, SC (US); Thomas C. Shehee, Williston, SC (US); Kathryn M. L. Taylor-Pashow, Aiken, SC (US)

(73) Assignees: University of South Carolina, Columbia, SC (US); Savannah River Nuclear Solutions, LLC, Aiken, SC (US)

( * ) Notice: Subject to any disclaimer, the term of this patent is extended or adjusted under 35 U.S.C. 154(b) by 524 days.

(21) Appl. No.: 16/004,990

(22) Filed: Jun. 11, 2018

(65) Prior Publication Data

US 2018/0353935 A1    Dec. 13, 2018

Related U.S. Application Data

(60) Provisional application No. 62/518,212, filed on Jun. 12, 2017.

(51) Int. Cl.
*B01J 20/285* (2006.01)
*B01D 15/22* (2006.01)
(Continued)

(52) U.S. Cl.
CPC ............ *B01J 20/285* (2013.01); *B01D 15/22* (2013.01); *B01J 20/267* (2013.01);
(Continued)

(58) Field of Classification Search
CPC .................... C08J 2201/026; C08J 2201/028; C08J 9/405; C08F 2/00; C08F 2/001;
(Continued)

(56) References Cited

U.S. PATENT DOCUMENTS

| 4,473,682 A | 9/1984 | Calundann et al. |
| 4,522,974 A | 6/1985 | Calundann et al. |

(Continued)

FOREIGN PATENT DOCUMENTS

| WO | WO 2005/014474 | 2/2005 |
| WO | WO 2008/019300 | 2/2008 |

(Continued)

OTHER PUBLICATIONS

Benicewicz et al., "Open-cell polymeric foam monoliths for heavy metal separations study", Journal of Radioanalytical and Nuclear Chemistry, Vo. 235, Nos. 1-2, 1998, pp. 31-35.

(Continued)

*Primary Examiner* — Kara M Peo
(74) *Attorney, Agent, or Firm* — DORITY & MANNING, P.A.

(57) ABSTRACT

A method of forming a high internal phase emulsion (HIPE) foam is provided. A nitroxide-containing monomer can be used in combination with other monomers that can then be used to make a high internal phase emulsion foam upon curing. The nitroxide group can subsequently be used to control the radical polymerization of many monomers, which can be grafted from the surface of the high internal phase emulsion foam. The resulting foam can be useful in performing separations of radioactive species, metals, metal ions, multi-element ions, metal complexes, halides, and organic chemical species in chemical process streams, clean-up operations, etc.

22 Claims, 9 Drawing Sheets

(51) Int. Cl.

| | | |
|---|---|---|
| *B01J 20/26* | (2006.01) | |
| *B01J 20/28* | (2006.01) | |
| *B01J 20/30* | (2006.01) | |
| *C08F 2/26* | (2006.01) | |
| *C08F 2/44* | (2006.01) | |
| *C08J 9/40* | (2006.01) | |

(52) U.S. Cl.
CPC ..... *B01J 20/28045* (2013.01); *B01J 20/3064* (2013.01); *B01J 20/3085* (2013.01); *C08F 2/26* (2013.01); *C08F 2/44* (2013.01); *C08J 9/405* (2013.01); *B01J 2220/52* (2013.01); *C08J 2201/026* (2013.01); *C08J 2339/08* (2013.01); *C08J 2351/06* (2013.01)

(58) Field of Classification Search
CPC ...... C08F 2/04; C08F 2/06; C08F 2/08; C08F 2/10; C08F 2/12; C08F 2/14; C08F 2/16; C08F 2/18; C08F 2/20; C08F 2/22; C08F 2/24; C08F 2/26; C08F 2/28; C08F 2/30; C08F 2/32; B01D 15/22; B01D 15/20; B01D 15/206; B01J 20/282; B01J 20/285; B01J 20/286; B01J 20/287; B01J 20/288; B01J 20/289; B01J 20/30; B01J 20/281; B01J 20/32; B01J 20/3202; B01J 20/3204; B01J 20/3206; B01J 20/3208; B01J 20/321; B01J 20/3212; B01J 20/3214; B01J 20/267; B01J 20/28045; B01J 20/3064; B01J 20/3085

See application file for complete search history.

(56) References Cited

U.S. PATENT DOCUMENTS

| | | | |
|---|---|---|---|
| 5,114,612 | A | 5/1992 | Benicewicz et al. |
| 5,315,011 | A | 5/1994 | Benicewicz et al. |
| 5,583,169 | A | 12/1996 | Wrobleski et al. |
| 5,595,666 | A | 1/1997 | Kochen et al. |
| 5,840,346 | A | 11/1998 | Smith et al. |
| 6,458,968 | B2 | 10/2002 | Benicewicz et al. |
| 6,765,076 | B2 | 7/2004 | Benicewicz et al. |
| 7,317,066 | B2 | 1/2008 | Benicewicz et al. |
| 7,393,878 | B2 | 7/2008 | Desmerais et al. |
| 7,736,778 | B2 | 6/2010 | Uensal et al. |
| 7,736,779 | B2 | 6/2010 | Uensal et al. |
| 7,745,030 | B2 | 6/2010 | Uensal et al. |
| 8,142,917 | B2 | 3/2012 | Uensal et al. |
| 9,145,304 | B2 | 9/2015 | Hobbs et al. |
| 9,475,922 | B2 | 10/2016 | Benicewicz et al. |
| 9,597,658 | B2 | 3/2017 | Taylor-Pashow et al. |
| 9,683,055 | B2 | 6/2017 | Benicewicz et al. |
| 9,806,365 | B2 | 10/2017 | Benicewicz et al. |
| 9,812,725 | B2 | 11/2017 | Benicewicz et al. |
| 9,884,935 | B2 | 2/2018 | Benicewicz et al. |
| 2006/0079392 | A1 | 4/2006 | Baurmeister et al. |
| 2007/0193885 | A1 | 8/2007 | Benicewicz et al. |
| 2007/0246373 | A1 | 10/2007 | Ludlow et al. |
| 2008/0281003 | A1 | 11/2008 | Akay et al. |
| 2011/0131881 | A1 | 6/2011 | Murakami et al. |
| 2014/0127958 | A1 | 5/2014 | Schadler et al. |
| 2014/0128502 | A1 | 5/2014 | Schadler et al. |
| 2015/0266990 | A1 | 9/2015 | Benicewicz et al. |
| 2017/0023535 | A1 | 1/2017 | Stanley et al. |
| 2017/0122875 | A1 | 5/2017 | Fondeur et al. |
| 2017/0166676 | A1 | 6/2017 | Viswanath et al. |
| 2017/0298158 | A1 | 10/2017 | Wang et al. |
| 2018/0123155 | A1 | 5/2018 | Benicewicz et al. |

FOREIGN PATENT DOCUMENTS

| | | |
|---|---|---|
| WO | WO 2008/060658 | 5/2008 |
| WO | WO 2013/108111 | 7/2013 |
| WO | WO 2014/111792 | 7/2014 |
| WO | WO 2014/111793 | 7/2014 |

OTHER PUBLICATIONS

Choudhury et al., "Supermacroporous PolyHIPE and Cryogel Monolithic Materials as Stationary Phases in Separation Science: A Review", Royal Society of Chemistry, vol. 7, No. 17, Sep. 2015, pp. 6921-7382.

Ansari, et al. "Chemistry of Diglycolamides: Promising Extractants for Actinide Partitioning" *Chem. Rev.* 112 (2012) pp. 1751-1772.

Barlik, et al. "Functionalized PolyHIPE Polymer Monoliths as an Anion-Exchange Media for Removal of Nitrate Ions from Aqueous Solutions" *Desalin. Water Treat.* 57 (2016) pp. 26440-26447. (Abstract only).

Barlik, et al. "Surface Modification of Monolithis PolyHIPE Polymers for Anion Functionality and their Ion Exchange Behavior" *J. Appl. Polym Sci.* 132 (2015) p. 42286. (Abstract only).

Barr, et al. "Plutonium(IV) Sorption by Soluble Anion-Exchange Polymers" *Sep. Sci. Technol.* 37 (2002) pp. 1065-1078.

Bhattacharyya, et al. "Solvent Extraction and Extraction Chromatographic Separation of $Am^{3+}$ and $Eu^{3+}$ from Nitrate Medium using Cyanex® 301" *Solvent Extr. Jon Exch.* 25 (2007) pp. 27-39.

De Decker, et al. "Carbamoylmethylphosphine Oxide-Functionalized MIL-101(Cr) as Highly Selective Uranium Adsorbent" *Anal. Chem.* 89 (2017) pp. 5678-5682.

De Los Reyes, et al. "Hydrolytic Stability of Mesoporous Zirconium Titanate Frameworks Containing Coordinating Organic Functionalities" *ACS Appl. Mater. Interfaces* 5 (2013) pp. 4120-4128.

Griffith, et al. "Hybrid Inorganic-Organic Adsorbents Part 1: Synthesis and Characterization of Mesoporous Zirconium Titanate Frameworks Containing Coordinating Organic Functionalities" *ACS Appl. Mater. Interfaces* 2 (2010) pp. 3436-3446.

Hawker, et al. "Preparation of Hyperbranched and Star polymers by a 'Living,' Self-Condensing Free Radical Polymerization" *J Am. Chem. Soc.* 117 (1995) pp. 10763-10764.

Hawker, C.J. Architectural Control in 'Living' Free Radical Polymerization: Preparation of Star and Graft Polymers. *Angew. Chem.* 34(13-14) (1995) pp. 1456-1459. (Abstract only).

Hawker, C.J. "Molecular Weight Control by a "Living" Free-Radical Polymerization Process" *J Am. Chem. Soc.* 116 (1994) pp. 11185-11186.

Huš, et al. "Separation of Heavy Metals from Water by Functionalized Glycidyl Methacrylate Poly(High Internal Phase Emulsions)" *J. Chromatogr. A* 1437 (2016) pp. 168-175. (Abstract only).

Inoue, et al. "Synthesis and Cation Exchange Properties of a new Porous Cation Exchange Resin having an Open-Celled Monolith Structure" *Polymer* 45 (2004) pp. 3-7.

Koler, et al. "Poly(4-vinylpyridine) polyHIPEs as Catalysts for Cycloaddition Click Reaction" *Polymer* 126 (2017) pp. 402-407.

Krajnc, et al. "Preparation and Characterisation of Poly(High Internal Phase Emulsion) Methacrylate. Monoliths and their Application as Separation Media" *J. Chromatogr. A* 1065 (2005) pp. 69-73.

Leung, et al. "Rasta Resin-$PPh_3$ and its use in Chromatography-Free Wittig Reactions" *Synlett* 13 (2010) pp. 1997-2001.

Luo, et al. "One-Pot Interfacial Polymerization to Prepare PolyHIPEs with Functional Surface" *Colloid Polym. Sci.* 293 (2015) pp. 1767-1779.

Mert, et al. "Preparation and Characterization of Polyester-Glycidyl Methacrylate PolyHIPE Monoliths to use in Heavy Metal Removal" *Des. Monomers Polym.* 15 (2012) pp. 113-126.

Moine, et al. "Preparation of High Loading PolyHIPE Monoliths as Scavengers for Organic Chemistry" *Tetrahedron Lett.* 44 (2003) pp. 7813-7816.

Navratil, et al. "Actinide Ion Exchange Technology in the Back End of the Nuclear Fuel Cycle" *Nukleonika* 46(2) (2001) pp. 75-80.

(56) References Cited

OTHER PUBLICATIONS

Pribyl, et al. "Photoinitiated Polymerization of 4-Vinylpyridine on PolyHIPE Foam Surface toward Improved Pu Separations" *Anal. Chem.* 89 (2017) pp. 5174-5178.

Pulko, et al. "Atrazine Removal by Covalent Bonding to Piperazine Functionalized PolyHIPEs" *Sci. Total Environ.* 386 (2007) pp. 114-123.

Savina, et al. "Ion-Exchange Macroporous Hydrophilic Gel Monlith with Grafted Polymer Brushes" *J. Mot. Recognit.* 19 (2006) pp. 313-321,.

Silverstein, M. S. "PolyHIPEs: Recent Advances in Emulsion-Templated Porous Polymers" *Prag. Polym. Sci.* 39 (2014) pp. 199-234.

Tripp, et al. "A Continuous-Flow Electrophile Scavenger Prepared by a Simple Grafting Procedure" *React. Func. Polym.* 70 (2010) pp. 414-418.

Veliscek-Carolan, et al. "Selective Sorption of Actinides by Titania Nanoparticles Covalently Functionalized with Simple Organic Ligands" *ACS Appl. Mater Interfaces* 5 (2013) pp. 11984-11994.

Williams, et al. "Emulsion Stability and Rigid Foams from Styrene or Divinylbenzene Water-in-Oil Emulsions" *Langmuir* 6 (1990) pp. 437-444.

Yarbro, et al. "Using Process Intensification in the Actinide Processing Industry" *J. Chem. Technol. Biotechnol.* 78(2-3) (2003) pp. 254-259. (Abstract only).

Zakharchenko, et al. "Sorption Recovery of U(VI), Pu(IV), and Am(III) from Nitric Acid Solutions with Solid-Phase Extractants based on Taunit Carbon Nanotubes and Polystyrene Supports" *Radiochemistry (Moscow, Russ. Fed.)* 56 (2014) pp. 27-31.

Zhang, et al. "Application of a Macroporous Silica-Based CMPO-Impregnated Polymeric Composite in Group Partitioning of Long-Lived Minor Actinides from Highly Active Liquid by Extraction Chromatography" *Ind. Eng. Chem. Res.* 47 (2008) pp. 6158-6165.

SURFACE GRAFTED HIGH INTERNAL PHASE EMULSION FOAMS FOR CHEMICAL SEPARATIONS

PRIORITY INFORMATION

The present application claims priority to U.S. Provisional Patent Application Ser. No. 62/518,212 titled "SURFACE GRAFTED HIGH INTERNAL PHASE EMULSION FOAMS FOR CHEMICAL SEPARATIONS," filed on Jun. 12, 2017, the disclosure of which is incorporated by reference herein.

STATEMENT AS TO RIGHTS TO INVENTIONS MADE UNDER FEDERALLY SPONSORED RESEARCH

This invention was made with Government support under Contract No. DE-AC09-08SR22470 awarded by the United States Department of Energy. The Government has certain rights in the invention.

BACKGROUND

Polymric resin beads are commonly used for chemical separations, industrial metal ion separations, actinide separations, and radionuclide separations. Resin beads are also useful for separations of halides, organic molecules, and other chemical species. However, the use of polymeric resin beads for such separations is inefficient and requires a large volume of solvent. Specifically, when resin beads are used in separations, most of the surface area available for solute sorption exists in the pores where the solvent is essentially stagnant. As such, diffusion is the dominant mechanism for mass transport. However, diffusion is a slow step that causes elution curves of individual components to overlap, making separations difficult. Although smaller and more uniform resin beads can address this problem, the use of smaller resin beads results in increased pressure drops across the column in which the resin beads are contained, which lowers throughput rates and increases the risk of channeling. Moreover, most of the solute collects on the surface of the resin beads, meaning that the center is not utilized for solute adsorption, which decreases the efficiency of liquid chromatography separations that utilize resin beads as the stationary phase.

As such, a need exists for an improved stationary phase that allows for more efficient separations of solutes via liquid chromatography.

SUMMARY OF THE INVENTION

In one particular embodiment of the present invention, a method of forming a high internal phase emulsion foam is provided. The method includes incorporating a functionalized co-monomer containing a nitroxide-mediated polymerization agent into a backbone of the high internal phase emulsion foam; and grafting a monomer from a surface of the high internal phase emulsion foam, wherein the nitroxide-mediated polymerization agent controls polymerization of the monomer.

In an additional embodiment, incorporating the functionalized co-monomer into the backbone of the high internal phase emulsion foam comprises blending an oil phase with an aqueous phase to form an emulsion that is then cured, wherein the oil phase comprises the functionalized co-monomer, an additional monomer, and a cross-linking agent.

In one embodiment, the functionalized co-monomer can have the following structure:

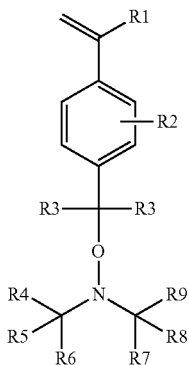

wherein R1 is H, $CH_3$, CN, or short alkyl; wherein R2 is methyl, ethyl, alkoxy, halide, or nitrile (cyano); wherein R3 is H, $CH_3$, $CH_2H_3$, short alkyl, phenyl, substituted phenyl, heteroaromatic, CN, or halide; and wherein R4-R9 are each independently a straight chain alkyl, a branched chain alkyl, a cycloalkyl, an arenyl group, a heterocyclic group, H phosphate, or phosphate ester, wherein each of R1-R9 are chosen to provide steric hindrance and weakening of the $O—CR3_2$ bond.

In another embodiment, the functionalized co-monomer can have the following structure

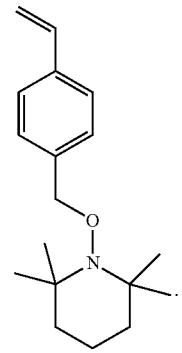

In still another embodiment, the functionalized co-monomer can have the following structure:

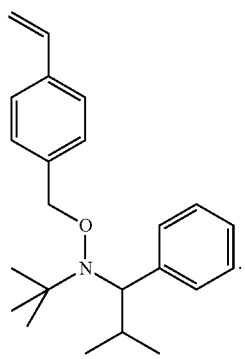 [SMILES: C=Cc1ccc(CON(C(c2ccccc2)C(C)C)C(C)(C)C)cc1]

In yet another embodiment, the functionalized co-monomer can have the following structure:

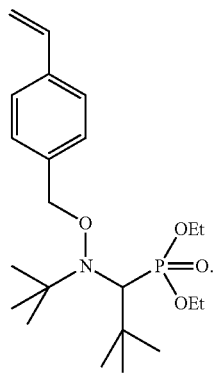 [SMILES: C=Cc1ccc(CON(C(C(C)(C)C)P(=O)(OCC)OCC)C(C)(C)C)cc1]

In one more embodiment, the additional monomer can be selected from the following classes of monomers: styrenics, acrylates, methacrylates, dienes, acrylamides, methacrylamides, vinyl esters, and vinyl pyridines.

In an additional embodiment, the cross-linking agent can include divinyl benzene.

In another embodiment, the oil phase can further include a surfactant.

In still another embodiment, the oil phase can further include an organic-soluble thermal initiator. For example, the organic-soluble thermal initiator can include azobisisobutyronitrile.

In yet another embodiment, the aqueous phase can include water and a water-soluble thermal initiator. For example, the water-soluble thermal initiator can include potassium persulfate.

In one more embodiment, grafting the monomer from the surface of the high internal phase emulsion foam can include soaking the high internal phase emulsion foam in a solution containing the monomer and a solvent. Further, the monomer can include 4-vinylpyridine or sodium 4-vinylbenzene sulfonate. Additionally, the solvent can include butanol, methanol, ethanol, propanol, isopropanol, dimethyl sulfoxide (DMSO), N,N-dimethylformamide (DMF), water, or a combination thereof.

In an additional embodiment, the emulsion can be cured at a temperature below a temperature at which the nitroxide-mediated polymerization agent is activated.

In another embodiment, grafting the monomer from the surface of the high internal phase emulsion foam can be carried out at a temperature above a temperature at which the nitroxide-mediated polymerization agent is activated.

In still another embodiment, the high internal phase emulsion foam can facilitate improved recovery and elution of metal ions or metal complexes as compared to resin beads.

In another particular embodiment of the present invention, a stationary phase for a liquid chromatography column, wherein the stationary phase comprises a high internal phase emulsion foam that is surface-grafted with a polymer via nitroxide-mediated polymerization, is provided.

In one embodiment, the high internal phase emulsion foam can include a nitroxide-containing co-monomer and an additional monomer.

In another embodiment, the additional monomer can be selected from the following classes of monomers: styrenics, acrylates, methacrylates, dienes, acrylamides, methacrylamides, vinyl esters, and vinyl pyridines.

In yet another embodiment, the surface-grafted polymer can include poly(4-vinylpyridine).

In still another embodiment, the surface-grafted polymer can include poly(sodium 4-vinylbenzene sulfonate).

In an additional embodiment of the present invention, a liquid chromatography column is provided. The liquid chromatography column includes a first connector; a second connector; a tube disposed between the first connector and the second connector; and a stationary phase disposed within the tube, wherein the stationary phase comprises a high internal phase emulsion foam that is surface-grafted with a polymer via nitroxide-mediated polymerization.

In one more embodiment of the present invention, a high internal phase emulsion foam is provided, wherein the high internal phase emulsion foam includes a nitroxide-containing co-monomer.

Other features and aspects of the present invention are set forth in greater detail below.

BRIEF DESCRIPTION OF THE DRAWINGS

A full and enabling disclosure of the present invention, including the best mode thereof to one skilled in the art, is set forth more particularly in the remainder of the specification, which includes reference to the accompanying figures.

DETAILED DESCRIPTION

Figure 1:
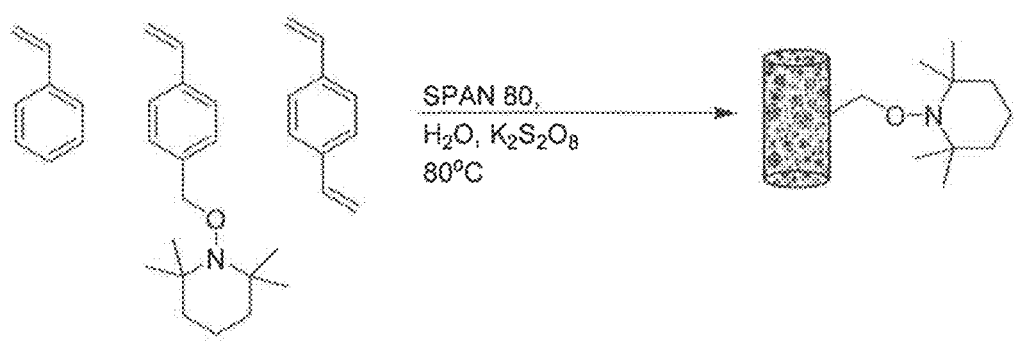
FIG. 1 illustrates an exemplary reaction scheme for the synthesis of a high internal phase emulsion (HIPE) foam functionalized with a nitroxide-mediated polymerization (NMP) agent.

Reference now will be made to the embodiments of the invention, one or more examples of which are set forth below. Each example is provided by way of an explanation of the invention, not as a limitation of the invention. In fact, it will be apparent to those skilled in the art that various modifications and variations can be made in the invention without departing from the scope or spirit of the invention. For instance, features illustrated or described as one embodiment can be used on another embodiment to yield still a further embodiment. Thus, it is intended that the present invention cover such modifications and variations as come within the scope of the appended claims and their equivalents. It is to be understood by one of ordinary skill in the art that the present discussion is a description of exemplary embodiments only, and is not intended as limiting the broader aspects of the present invention, which broader aspects are embodied exemplary constructions.

Generally speaking, the present invention is directed to a method of forming a high internal phase emulsion (HIPE) foam that includes the steps of (i) incorporating a nitroxide-mediated polymerization agent into the backbone of the HIPE foam structure through the use of a functionalized co-monomer; and then (ii) surface-grafting a polymer from the surface of the high internal phase emulsion foam. The resulting high internal phase emulsion foam exhibits improved adsorption and elution characteristics when used as the stationary phase of a liquid chromatography column compared to when polymeric resin beads are used as the stationary phase of a liquid chromatography column. For instance, the high internal phase emulsion foam can adsorb at least about 0.075 grams of material (e.g., a radioactive material such as plutonium) per gram of the foam, such as from about 0.08 grams of material per gram of the foam to about 10 grams of material per gram of foam, such as from about 0.1 grams of material per gram of foam to about 5 grams of material per gram of foam. In contrast, polymeric resin beads can only adsorb about 0.04 grams of material per gram of the polymeric resin beads. Moreover, removing the material from the foam of the present invention is much more efficient compared to polymeric resin beads in that less than about 4 bed volumes of solvent, such as less than about 3.5 bed volumes of solvent, such as less than about 3 bed volumes of solvent, such as less than about 2.5 bed volumes of solvent are required to remove the adsorbed material from the foam. On the other hand, about 4.5 bed volumes of solvent are required to remove the same adsorbed material from polymeric resin beads. Without intending to be limited by any particular theory, the present inventors have found that such a distinction between the high internal phase emulsion (HIPE) foam and polymeric resin beads may be due at least in part to the open pore structure of the foam as well as the manner in which the active polymer chains are grafted from the surface of the foam, where a nitroxide containing co-monomer which is incorporated into the foam structure is used to control the radical polymerization of monomers that are grafted from the surface of the foam.

The various methods and components utilized to form the high internal phase emulsion foam are discussed in more detail below.

I. Formation of High Internal Phase Emulsion Foams Functionalized with NMP Agent In the first step of forming the high internal phase emulsion (HIPE) foams of the present invention, an emulsion of an oil phase containing a nitroxide-containing co-monomer, an additional monomer, a cross-linking agent, and a surfactant are blended with an aqueous phase containing a thermally-activated radical polymerization initiator to form a foam that is functionalized with a nitroxide-mediated polymerization agent that is cured. Alternatively, an oil or monomer soluble initiator can be used, such as azobisisobutyronitrile. The oil phase components can be blended together in a kettle equipped with a stirrer, where the stirrer is rotated at a speed of about 300 rpm to 400 rpm, and the aqueous phase can be added to the oil phase dropwise over a time period ranging from about 10 minutes to about 20 minutes. The emulsion can then be deposited into a tube that is sealed on one end for curing. The curing can be carried out in an oven having a temperature that is less than about 90° C., such as a temperature ranging from about 60° C. to about 85° C., such as from about 70° C. to about 80° C., such as from about 75° C. to about 80° C., where such temperatures are sufficiently high to cure the foam but are low enough so as not to activate the nitroxide-mediated polymerization agent included in the nitroxide-containing co-monomer. In one embodiment, the oil phase can constitute from about 5 wt. % to about 20 wt. % of the total weight of the emulsion, such as from about 7.5 wt. % to about 17.5 wt. % of the total weight of the emulsion, such as from about 10 wt. % to about 15 wt. % of the total weight of the emulsion. The specific components of the oil phase and the aqueous phase of the emulsion are discussed in more detail below. Meanwhile, the aqueous phase can constitute from about 80 wt. % to about 95 wt. % of the total weight of the emulsion, such as from about 82.5 wt. % to about 92.5 wt. % of the total weight of the emulsion, such as from about 85 wt. % to about 90 wt. % of the total weight of the emulsion.

a. Oil Phase

Nitroxide-Containing Co-Monomer

First, the oil phase can include a nitroxide-containing co-monomer, where the nitroxide group can be used to control the radical polymerization of monomers grafted from the surface of the foam after it is cured. Any monomer class or type that can be radically polymerized can be used, including, but not limited to, styrenics, acrylates, methacrylates, dienes, acrylamides, methacrylamides, vinyl esters, and vinyl pyridines. In addition, any nitroxide that is capable of controlling the polymerization of the monomer that is ultimately grafted from a surface of the high internal phase emulsion foam is contemplated for use in the present invention. In one particular embodiment, the nitroxide can be 2,2,6,6-tetramethyl-1-piperidinyloxyl (TEMPO). In other embodiments, other nitroxides that can be used include, but are not limited to, 3,6-dihydro-2,2,6,6-tetramethyl-1(2H)-pyridinyloxy (DHTMPO), 4-hydroxy-2,2,6,6-tetramethyl-1-piperidinyloxy (HTMPO), 4-Acetoxy-2,2,6,6-tetramethyl-1-piperidinyloxy (ATMPO), 6,6-tetramethylpiperidinyloxy (BTMPO), 6,6-tetramethylpiperidinyloxy (BuTMPO), di-tert-butyl nitroxide (DBNO), 6,6-tetramethyl-1-piperidinyloxy (CTMPO), 1,1,3,3-tetraethylisoindolin-2-oxyl nitroxide (TEDIO), 1,1,3,3-tetramethylisoindolin-2-oxyl nitroxide (TMIO), 2,2,5-trimethyl-4-phenyl-3-azahexane-3-oxy (TIPNO), 2,2,5-trimethyl-4-fluorophenyl-3-azahexane-3-oxyl (F-TIPNO), 2,2,5-trimethyl-4-(isopropyl)-3-azahexane-3-oxyl (DIPNO), N-tert-butyl-N-[1-diethylphosphono-(2,2-dimethylpropyl)] nitroxide (SG1), 2,2- diphenyl-3-phenylimino-2,3-dihydroindol-1-yloxy (DPAIO), 4-glycidyloxy-2,2,6,6-tetramethylpiperidine-1-oxyl (GTEMPO) or a combination thereof.

In one embodiment, the functionalized co-monomer can have the following structure:

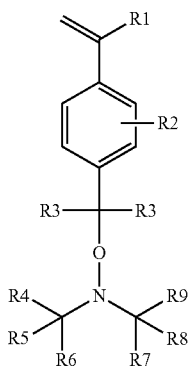

Formula 1

A nitroxide-containing co-monomer to generate
NMP agent functionalized HIPE foams In Formula 1, R1 is H, CH$_3$, CN, or short alkyl; R2 is methyl, ethyl, alkoxy, halide, or nitrile (cyano); R3 is H, CH$_3$, CH$_2$H$_3$, short alkyl, phenyl, substituted phenyl, heteroaromatic, CN, or halide; and R4-R9 are each independently a straight chain alkyl, a branched chain alkyl, a cycloalkyl, an arenyl group, a heterocyclic group, H phosphate, or phosphate ester, where each of R4-R9 can bear functional groups such as alcohols, acids, halides, amines, esters, ketones, ethers, etc. In Formula 1, each of R1-R9 are chosen to provide steric hindrance and weakening of the O—CR3$_2$ bond.

In one particular embodiment, the nitroxide-containing co-monomer can be TEMPO-styrene, which is represented by the chemical structure shown below in Formula 2.

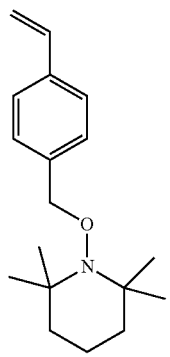

Formula 2

A nitroxide-containing co-monomer (TEMPO-styrene) to generate NMP agent functionalized HIPE foams In another embodiment, the nitroxide-containing co-monomer can be TIPNO-styrene, which is represented by the chemical structure shown below in Formula 3.

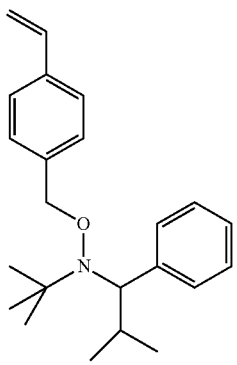

Formula 3

Another nitroxide-containing co-monomer
(TIPNO-styrene) to generate NMP agent
functionalized HIPE foams In yet another embodiment, the nitroxide-containing co-monomer can be SG1-styrene, which is represented by the chemical structure shown below in Formula 4.

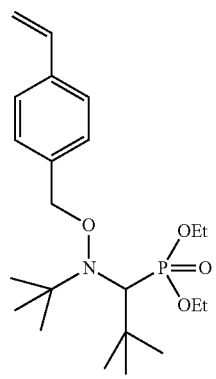

Formula 4

An additional nitroxide-containing co-monomer
(SG1-styrene) to generate NMP agent
functionalized HIPE foams Regardless of the particular nitroxide-containing co-monomer utilized in the oil phase of the emulsion for forming the high internal phase emulsion (HIPE) foam of the present invention, the nitroxide-containing monomer can be present in an amount ranging from about 5 wt. % to about 90 wt. %, such as from about 10 wt. % to about 70 wt. %, such as from about 15 wt. % to about 50 wt. % based on the total weight of the oil phase of the emulsion.

Additional Monomer

In addition to a nitroxide-containing co-monomer, the oil phase of the emulsion for forming the high internal phase emulsion (HIPE) foam of the present invention can include an additional co-monomer. The additional co-monomer can be a monomer which contains the same polymerizable functionality as the NMP-functionalized co-monomer including styrenics, acrylates, or methacrylates, dienes, acrylamides, methacrylamides, vinyl esters, and vinyl pyridines. Regardless of the particular additional monomer utilized in the oil phase of the emulsion for forming the high internal phase emulsion (HIPE) foam of the present invention, the additional monomer can be present in an amount ranging from about 1 wt. % to about 50 wt. %, such as from about 12 wt. % to about 45 wt. %, such as from about 14 wt. % to about 40 wt. % based on the total weight of the oil phase of the emulsion.

Cross-Linking Agent

In addition to a nitroxide-containing monomer and an additional monomer, the oil phase of the emulsion for forming the high internal phase emulsion (HIPE) foam of the present invention can include a cross-linking agent. The cross-linking agent can include divinyl benzene, ethylene glycol dimethacrylate or diacrylate and derivatives such as diethyleneglycol dimethacrylate or diacrylate, triethyleneglycol dimethacrylate or diacrylate divinyl ketone, vinyl methacrylate, divinyl oxalate, methylene($C_1$-$C_{12}$)-bisarylamides, bis-allyl crosslinkers, or a combination thereof. In addition to di- or bis-functional crosslinkers, tri- and tetra-functional derivatives can be used.

Regardless of the particular cross-linking agent utilized in the oil phase of the emulsion for forming the high internal phase emulsion (HIPE) foam of the present invention, the cross-linking agent can be present in an amount ranging from about 1 wt. % to about 40 wt. %, such as from about 10 wt. % to about 25 wt. %, such as from about 15 wt. % to about 20 wt. % based on the total weight of the oil phase of the emulsion.

Surfactant

The oil phase of the emulsion for forming the high internal phase emulsion (HIPE) foam of the present invention can also include a surfactant. In one particular embodiment, the surfactant can be a nonionic surfactant, which typically have a hydrophobic base (e.g., long chain alkyl group or an alkylated aryl group) and a hydrophilic chain (e.g., chain containing ethoxy and/or propoxy moieties). Some suitable nonionic surfactants that may be used include, but are not limited to, ethoxylated alkylphenols, ethoxylated and propoxylated fatty alcohols, polyethylene glycol ethers of methyl glucose, polyethylene glycol ethers of sorbitol, ethylene oxide-propylene oxide block copolymers, ethoxylated esters of fatty ($C_8$-$C_{18}$) acids, condensation products of ethylene oxide with long chain amines or amides, condensation products of ethylene oxide with alcohols, fatty acid esters, monoglycerides, or diglycerides of long chain alcohols, and mixtures thereof. Particularly suitable nonionic surfactants may include ethylene oxide condensates of fatty alcohols (e.g., sold under the trade name Lubrol), polyoxyethylene ethers of fatty acids (particularly $C_{12}$-$C_{20}$ fatty acids), polyoxyethylene sorbitan fatty acid esters (e.g., sold under the trade name TWEEN®), sorbitan fatty acid esters (e.g., sold under the trade name SPAN™ or ARLACEL®), or a combination thereof. The fatty components used to form such surfactants may be saturated or unsaturated, substituted or unsubstituted, and may contain from 6 to 22 carbon atoms, in some embodiments from 8 to 18 carbon atoms, and in some embodiments, from 12 to 14 carbon atoms.

Although any nonionic surfactant may generally be employed, the use of a lipophilic nonionic surfactant may help stabilize the emulsion. As is known in the art, the relative hydrophilicity or lipophilicity of a surfactant can be characterized by the hydrophilic/lipophilic balance ("HLB") scale, which measures the balance between the hydrophilic and lipophilic solution tendencies of a compound. The HLB scale ranges from 0.5 to approximately 20, with the lower numbers representing highly lipophilic tendencies and the higher numbers representing highly hydrophilic tendencies. Desirably, the emulsion used to form the high internal phase emulsion of the present invention can include at least one "lipophilic" surfactant that has an HLB value of from about 0.5 to about 10, in some embodiments from about 1 to about 9, and in some embodiments, from about 2 to about 8. One particularly useful group of "lipophilic" surfactants are sorbitan fatty acid esters (e.g., monoesters, diester, triesters, etc.) prepared by the dehydration of sorbitol to give 1,4-sorbitan, which is then reacted with one or more equivalents of a fatty acid. The fatty-acid substituted moiety can be further reacted with ethylene oxide to give a second group of surfactants. The fatty-acid-substituted sorbitan surfactants are made by reacting 1,4-sorbitan with a fatty acid such as lauric acid, palmitic acid, stearic acid, oleic acid, or a similar long chain fatty acid to give the 1,4-sorbitan mono-ester, 1,4-sorbitan sesquiester or 1,4-sorbitan triester. The common names for these surfactants include, for example, sorbitan monolaurate, sorbitan monopalmitate, sorbitan monoestearate, sorbitan monooleate, sorbitan sesquioleate, and sorbitan trioleate. Such surfactants are commercially available under the name SPAN™ or ARLACEL™, usually with a letter or number designation which distinguishes between the various mono-, di- and triester substituted sorbitans. SPAN™ and ARLACEL™ surfactants are lipophilic and are generally soluble or dispersible in oil, but not generally soluble in water. One particularly suitable surfactant is sorbitan monooleate, which is commercially available as SPAN™ 80. Generally these surfactants will have an HLB value in the range of 1.8 to 8.6.

Regardless of the particular surfactant utilized in the oil phase of the emulsion for forming the high internal phase emulsion (HIPE) foam of the present invention, the surfactant can be present in an amount ranging from about 10 wt. % to about 55 wt. %, such as from about 20 wt. % to about 35 wt. %, such as from about 25 wt. % to about 30 wt. % based on the total weight of the oil phase of the emulsion.

In addition to the components discussed above, it is also to be understood that the oil phase can also contain an oil or monomer soluble initiator, such as azobisisobutyronitrile rather than using a water-soluble thermal initiator, which is discussed in more detail below.

b. Aqueous Phase

The aqueous phase of the emulsion for forming the high internal phase emulsion (HIPE) foam of the present invention can include water, emulsion-stabilizing ions (e.g. calcium carbonate, potassium carbonate), and a water-soluble thermal radical initiator which may include one or more azo initiators or inorganic peroxides (e.g., potassium persulfate). The water can be present in the aqueous phase of the emulsion for forming the high internal phase emulsion (HIPE) foam of the present invention in an amount ranging from about 75 wt. % to about 100 wt. %, such as from about 85 wt. % to about 99.5 wt. %, such as from about 95 wt. % to about 99.4 wt. % based on the total weight of the aqueous phase of the emulsion. Meanwhile, regardless of the particular persulfate utilized in the aqueous phase of the emulsion for forming the high internal phase emulsion (HIPE) foam of the present invention, the persulfate can be present in an amount ranging from about 0.4 wt. % to about 2 wt. %, such as from about 0.5 wt. % to about 1.5 wt. %, such as from about 0.6 wt. % to about 1 wt. % based on the total weight of the aqueous phase of the emulsion.

II. Surface-Grafting of a Polymer to the Surface of the HIPE Foam via NMP

After the emulsion has been cured so that a high internal phase emulsion foam monolith is formed, where the foam is functionalized with a nitroxide-mediated polymerization (NMP) agent as discussed above, a polymer can be grafted from a surface of the foam, where the incorporated NMP is homolytically cleaved, generating a free radical which initiates the polymerization, and the free-radical NMP agent controls the radical polymerization of the monomer from the surface. To form a foam where a polymer is grafted from the surface of the foam via NMP, the foam monolith can be placed in a flask with a stir bar. The flask can then be sealed and deoxygenated, such as via a plurality of cycles of evacuation and backfilling with nitrogen, or by sparging with an inert gas such as nitrogen or argon. Meanwhile, in a separate flask, a polymerization solution containing the monomer to be grafted from the surface of the foam and a solvent can be degassed by multiple cycles of freeze-pump-thaw or sparging with an inert gas (such as nitrogen or argon), after which the solution can be transferred to the flask containing the foam to form a reaction mixture. The reaction mixture can then be heated, such as by placing in an oil bath and allowed to stir for a time period ranging from about 5 hours to about 96 hours, such as from about 12 hours to about 28 hours, such as from about 14 hours to about 26 hours. The temperature during this time can be greater than 80° C., such as from about 95° C. to about 160° C., such as from about 115° C. about 150° C., such as from about 120° C. to about 140° C., in order to activate the nitroxide-mediated polymerization agent.

Any suitable monomer can be grafted from the surface of the foam monolith of the present invention. Suitable monomer classes include styrenics, vinyl pyridines, acrylates, methacrylates, acrylamides, methacrylamides, dienes, and vinyl esters. Such monomers may also include specific functional groups, including but not limited to sulfonic acids, alcohols, carboxylic acids, epoxies, amines, phosphonates, phosphines, 1,3-dicarbonyls. In one particular embodiment, the monomer can be 4-vinylpyridine so that after polymerization, chains of poly(4-vinylpyridine) are grafted from a surface of the foam monolith. Regardless of the monomer used, the monomer can be present in the polymerization solution in an amount ranging from about 5 wt. % to about 80 wt. %, such as from about 10 wt. % to about 60 wt. %, such as from about 20 wt. % to about 40 wt. % based on the total weight of the polymerization solution.

Although any suitable solvent can be used in the polymerization solution, meaning any solvent in which the monomer and resulting grafted polymer are both soluble, in one particular embodiment, the solvent is an alcohol, such as butanol (e.g., n-butanol), methanol, ethanol, propanol, or isopropanol. Suitable solvents may also include dimethyl sulfoxide (DMSO), N,N-dimethylformamide (DMF), water, or a combination thereof. Regardless of the particular solvent or mixture of solvents utilized when grafting a monomer from the surface of the foam monolith, the solvent can be present in the solution in an amount ranging from about 20 wt. % to about 95 wt. %, such as from about 40 wt. % to about 85 wt. %, such as from about 60 wt. % to about 80 wt. % based on the total weight of the polymerization solution.

III. Stationary Phase of a Liquid Chromatography Column

Figure 5:
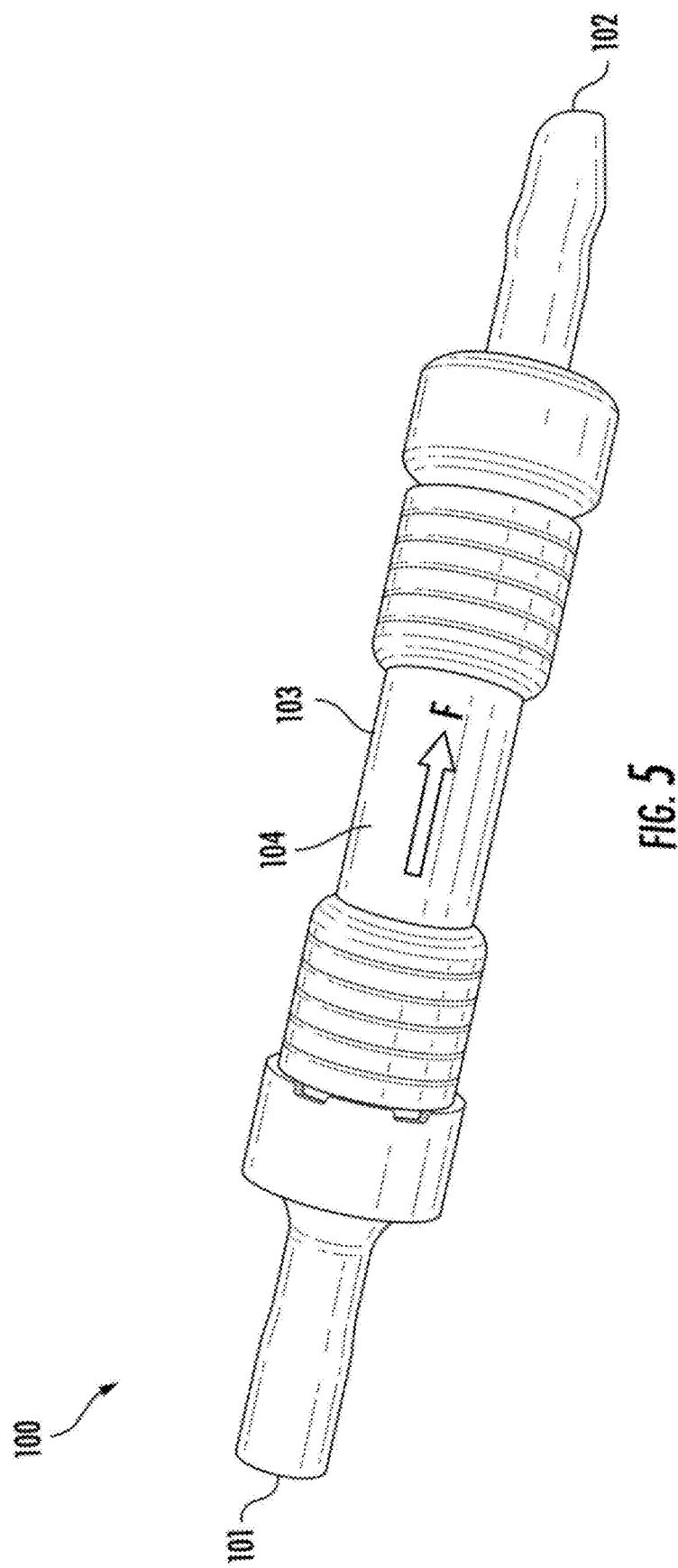
FIG. 5 is a perspective view of a liquid chromatography column containing high internal phase emulsion (HIPE) foam with a polymer that is surface-grafted thereto via nitroxide-mediated polymerization (NMP).

After the foam monolith is formed and a polymer is grafted from its surface via nitroxide-mediated polymerization, the foam formed as described above can be used as a stationary phase of a liquid chromatography column and can be useful in performing separations of radioactive (e.g. plutonium), metal (e.g., iron, lead) and metal oxides, halides and nitrides, inorganic ions, and chemical species of both anions (for example, bromide ions, iodide ions, nitrate ions) and cations (for example, ammonium, phosphonim, sulfonium ions) in chemical process streams, optical isomers, clean-up operations, food and cosmetic applications, biological separations of enzymes, sugars, saccharides, amino acids, chelation and adsorbent applications, etc. Referring to FIG. 5, one embodiment of a liquid chromatography column 100 is shown. The column 100 includes a first connector 101, a second connector 102, a tube (e.g., a tube formed from a rigid material such as glass, metal, epoxy or plastic tube or heat-shrink plastic tube) 103 disposed between the first connector 101 and the second connector 102, and a stationary phase 104 contained within the tube 103. The stationary phase 104 is in the form of the high internal phase emulsion foam of the present invention, where the foam is surface-grafted with a polymer via nitroxide-mediated polymerization. A liquid can be introduced from a tubing attached to connector 101 and flow in direction F, where the stationary phase 104 can adsorb a predetermined material from the liquid (e.g., a radioactive, metal, or chemical species, etc.). The present invention may be better understood with reference to the following examples.

Example 1

A surface-grafted high internal phase emulsion (HIPE) foam was formed according the methods contemplated by the present invention, and the plutonium loading and elution characteristics of a column containing the foam as the stationary phase were compared to a column containing resin beads as the stationary phase.

Figure 2:
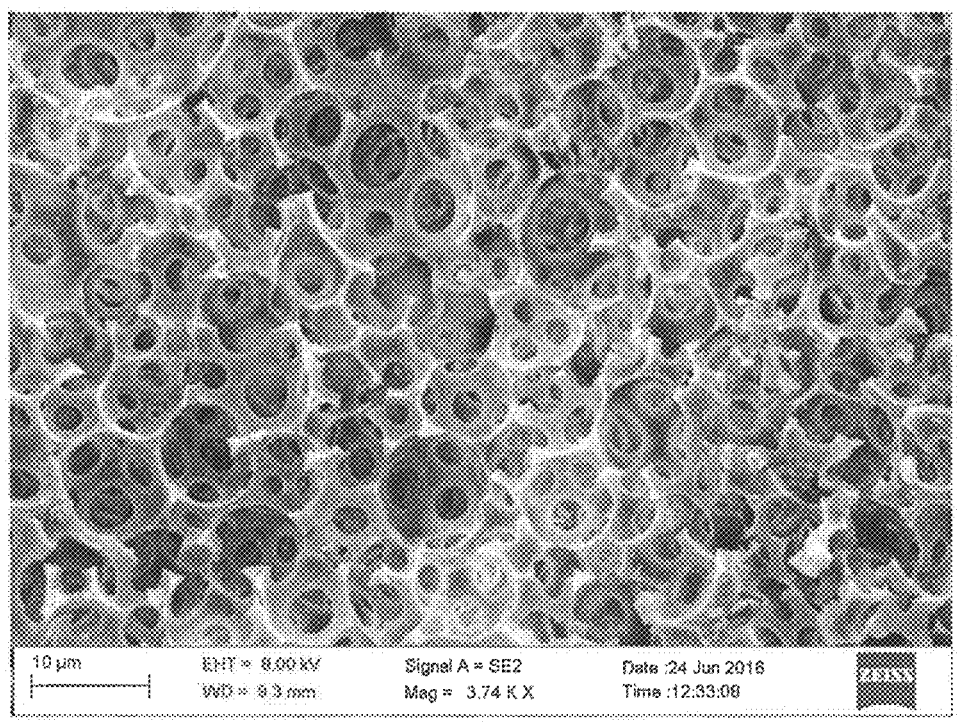
FIG. 2 is a scanning electron microscopy (SEM) image of a cured high internal phase emulsion (HIPE) foam functionalized with a nitroxide-mediated polymerization (NMP) agent according the reaction scheme of FIG. 1.

First, and referring to FIG. 1, a high internal phase emulsion foam functionalized with a nitroxide-mediated polymerization (NMP) agent was formed from an emulsion containing a continuous oil phase and an internal aqueous phase. The oil phase included the co-monomers of styrene (0.575 grams), divinyl benzene (0.275 grams, acting as a cross-linking agent), and TEMPO-styrene (0.250 grams), as well as a sorbitan monooleate (SPAN 80) surfactant (0.40 grams). The components of the oil phase were added to a small resin kettle equipped with a glass paddle stirrer. The aqueous phase included water (11.0 grams) and potassium persulfate ($K_2S_2O_8$) (0.085 grams) and was combined separately from the oil phase and was added slowly to the stirring oil phase (350 rpm) via a dropwise addition funnel for a period of about 15 minutes. The resulting emulsion was deposited into prepared glass tubing with one sealed end and was cured overnight in an 80° C. oven. The cured foam monoliths were then removed from the glass tubing by breaking the glass tubing, after which the foam monoliths were washed in a Soxhlet extractor for 24 hours using ethanol as the extraction solvent. The foam monoliths were then dried overnight at 80° C. and stored in plastic until use in the next step. The foam monoliths contained 80.15% carbon, 7.42% hydrogen, and 1.12% nitrogen. Referring to FIG. 2, an SEM image of a sample foam monolith shows the pores formed in the resulting open-celled polymeric foam.

Figure 3:
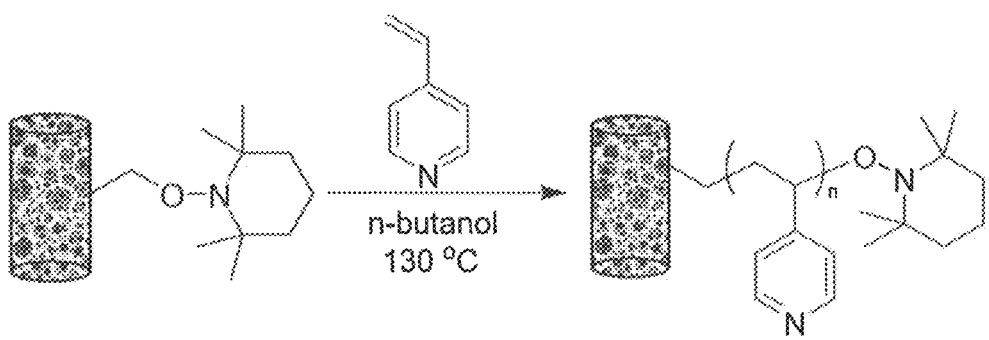
FIG. 3 illustrates an exemplary reaction scheme for the formation of a high internal phase emulsion (HIPE) foam with a polymer (e.g., poly(4-vinylpyridine)) surface-grafted thereto via nitroxide-mediated polymerization (NMP).

Next, and referring to FIG. 3, to perform the surface-initiated nitroxide-mediated polymerization, 0.0639 grams of the high internal phase emulsion foam monolith formed as shown in FIGS. 1 and 2 was placed in a Schlenk flask with a magnetic stir bar. The flask was sealed and then deoxygenated by five cycles of evacuation and backfilling with nitrogen ($N_2$). In a separate Schlenk flask, a mixture of freshly-distilled 4-vinyl pyridine (7.5 milliliters) and n-butanol (17.5 milliliters), was degassed by three cycles of freeze-pump-thaw. The degassed solution was then transferred to the flask containing the foam monolith via a gas-tight syringe. The reaction mixture was then placed in a 130° C. oil bath and stirred for 25 hours. The resulting polymer-grafted foam monolith was washed in a Soxhlet extractor for 24 hours using ethanol as the extraction solvent. The foam monolith was then dried overnight at 80° C.

Figure 4:
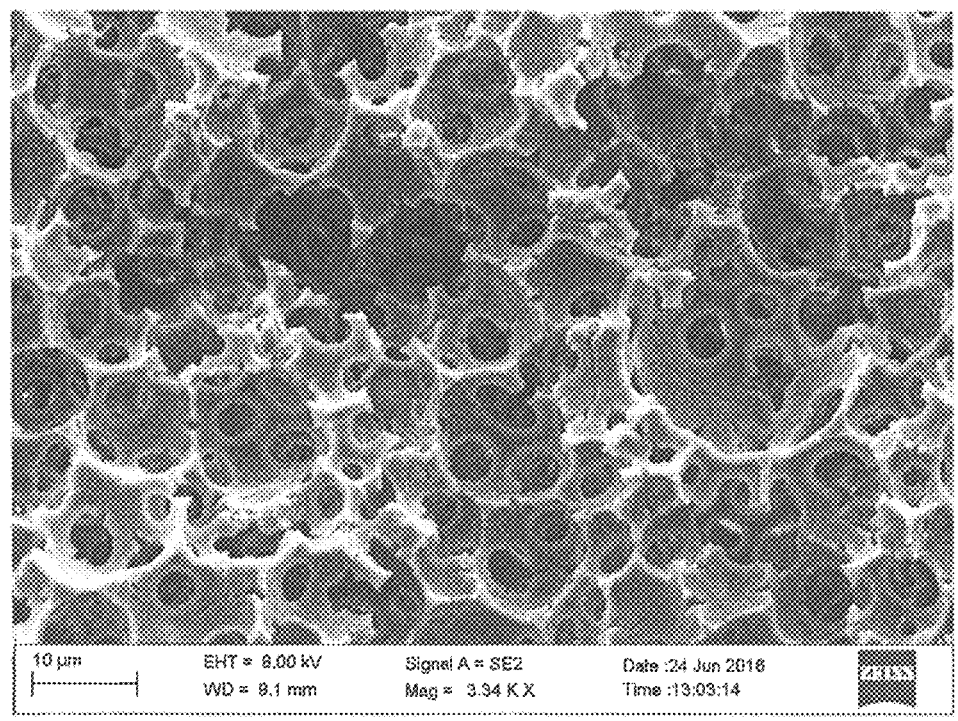
FIG. 4 is a scanning electron microscopy (SEM) image of a nitroxide-mediated polymerization (NMP)-functionalized high internal phase emulsion (HIPE) foam post-polymerization, such as a foam formed via the reaction schemes of FIGS. 1 and 2.

After polymerization, the foam weighted 0.2979 grams, which equaled a 366% weight gain. The foam monolith contained 76.01% carbon, 6.88% hydrogen, and 10.05% nitrogen. Referring to FIG. 4, an SEM of a sample foam monolith shows the polymeric chains (poly(4-vinylpyridine)) grafted at the edge of the pores formed in the open-celled polymeric foam.

Figure 6:
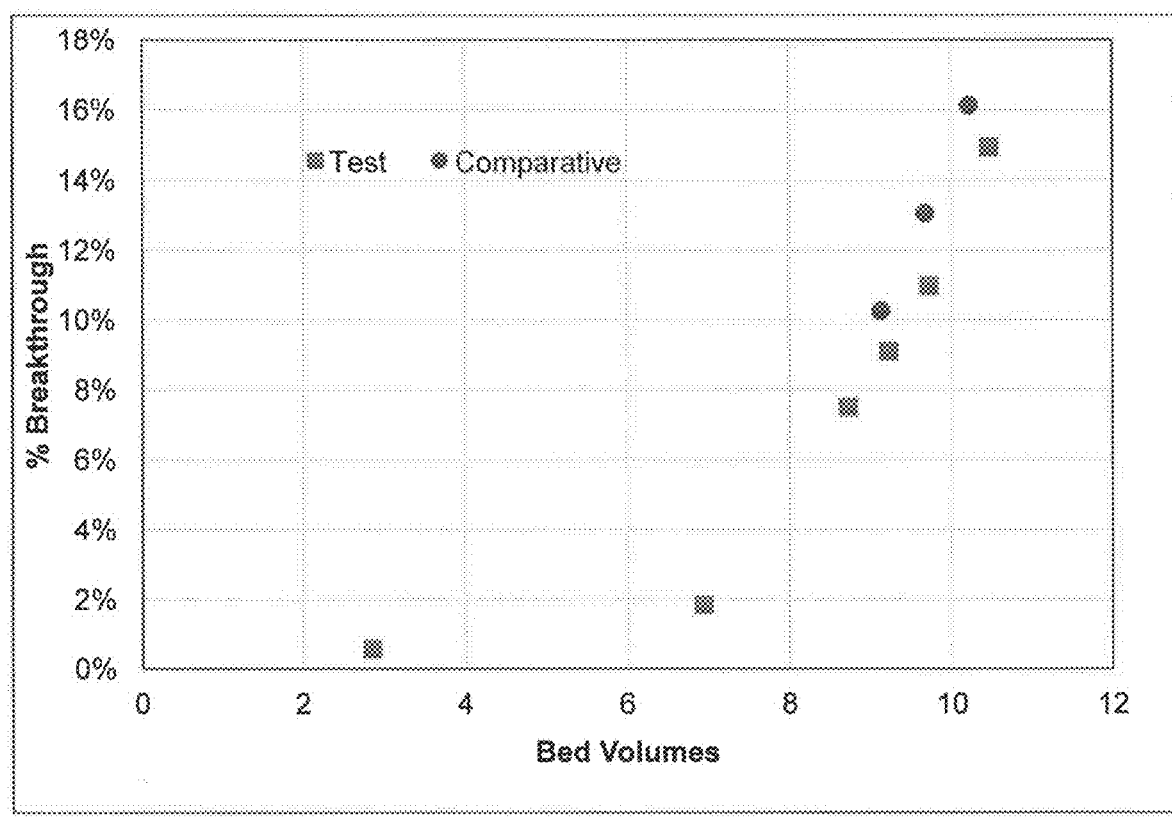
FIG. 6 is a graph comparing the plutonium loading characteristics of the high internal phase emulsion foam of one example of the present invention with that of polymeric resin beads.
Figure 7:
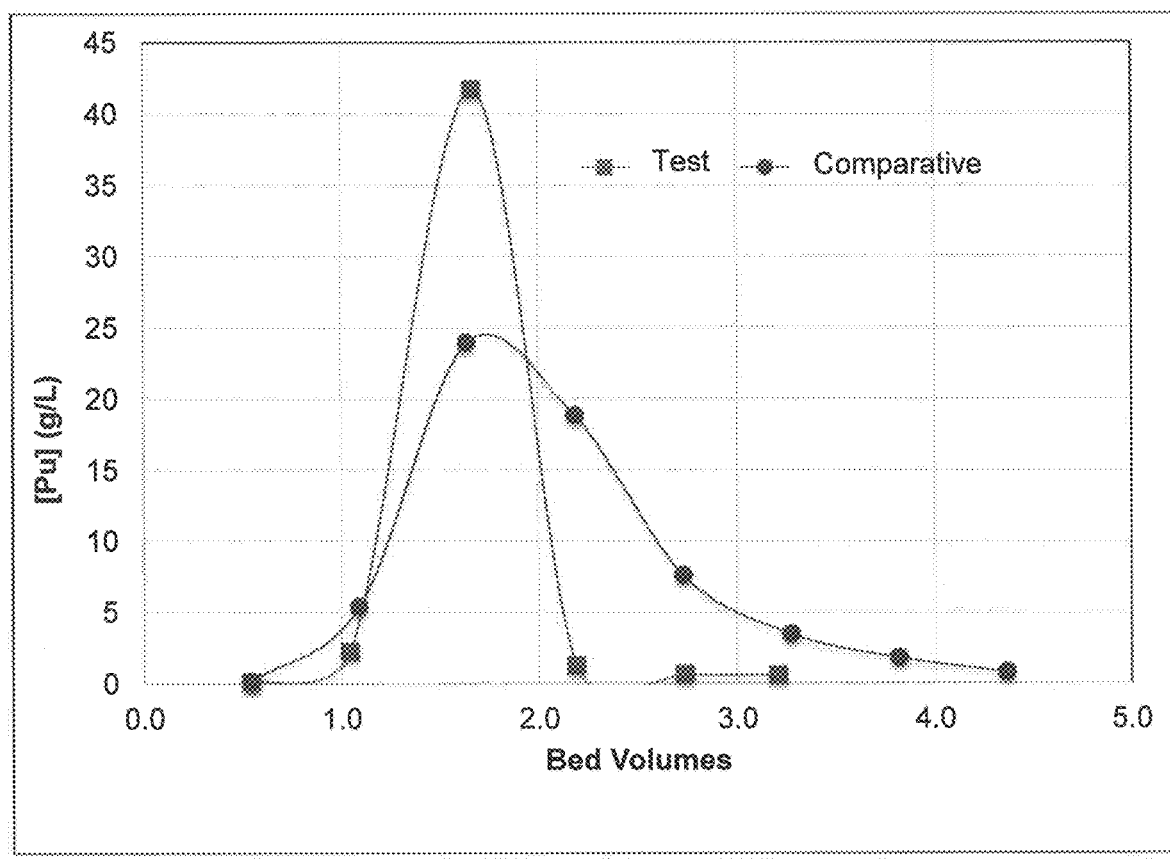
FIG. 7 is a graph comparing the elution characteristics of the high internal phase emulsion foam of one example of the present invention with that of polymeric resin beads.

Next, liquid chromatography column prototypes for flow testing were prepared by connecting the polymer-grafted foam monolith to hose connectors and sealing the assembly in four layers of high strength heat-shrink tubing. Then, the loading and elution characteristics of the polymer-grafted foam monolith of the present invention were investigated and compared to a column formed from resin beads (Reillex® HPQ resin) using an about 4 gram/liter feed solution of plutonium present as $[Pu(NO_3)_6]^{2-}$ in about 8 M nitric acid. As shown in FIG. 6, the column containing the polymer-grafted foam monolith of the present invention had similar plutonium uptake capacity as a function of bed volume compared to the commonly used industrial resin Reillex® HPQ. In addition, based on weight, the polymer-grafted foam monolith of the present invention was able to absorb 0.185 grams of plutonium per gram of foam, while the Reillex® HPQ resin was only able to absorb 0.038 grams of plutonium per gram of resin. Moreover, as shown in FIG. 7, the polymer-grafted foam monolith of the present invention showed better elution characteristics than the resin. Specifically, a narrow elution profile was observed, and the concentration of the eluate reached greater than ten times the concentration of the feed for the polymer-grafted foam monolith of the present invention. In other words, the ability to recover the plutonium from the polymer-grafted foam monolith of the present invention only required about 2.5 bed volumes of solvent, while 4.5 bed volumes of solvent were required to recover the plutonium from the resin beads, meaning that it requires less solvent and is more efficient to remove the material adsorbed onto to the polymer-grafted foam monolith of the present invention compared to the resin beads.

Example 2

A surface-grafted high internal phase emulsion (HIPE) foam was formed according the methods contemplated by the present invention, and the plutonium loading and elution characteristics of a column containing the foam as the stationary phase were compared to a column containing resin beads as the stationary phase.

First, and referring to FIG. 1, a high internal phase emulsion foam functionalized with a nitroxide-mediated polymerization (NMP) agent was formed from an emulsion containing a continuous oil phase and an internal aqueous phase. The oil phase included the co-monomers of styrene (0.44 grams), divinyl benzene (0.275 grams, acting as a cross-linking agent), and TEMPO-styrene (0.385 grams), as well as a sorbitan monooleate (SPAN 80) surfactant (0.56 grams). The components of the oil phase were added to a small resin kettle equipped with a glass paddle stirrer. The aqueous phase included water (11.0 grams) and potassium persulfate ($K_2S_2O_8$) (0.150 grams) and was combined separately from the oil phase and was added slowly to the stirring oil phase (350 rpm) via a dropwise addition funnel for a period of about 15 minutes. The resulting emulsion was deposited into prepared glass tubing with one sealed end and was cured overnight in an 80° C. oven. The cured foam monoliths were then removed from the glass tubing by breaking the glass tubing, after which the foam monoliths were washed in a Soxhlet extractor for 24 hours using ethanol as the extraction solvent. The foam monoliths were then dried overnight at 80° C. and stored in plastic until use in the next step. The foam monoliths contained 80.48% carbon, 7.75% hydrogen, and 1.49% nitrogen. Referring to FIG. 2, an SEM image of a sample foam monolith shows the pores formed in the resulting open-celled polymeric foam.

Next, and referring to FIG. 3, to perform the surface-initiated nitroxide-mediated polymerization, 0.0538 grams of the high internal phase emulsion foam monolith formed as shown in FIGS. 1 and 2 was placed in a Schlenk flask with a magnetic stir bar. The flask was sealed and then deoxygenated by five cycles of evacuation and backfilling with nitrogen ($N_2$). In a separate Schlenk flask, a mixture of freshly-distilled 4-vinylpyridine (7.5 milliliters) and n-butanol (17.5 milliliters), was degassed by three cycles of freeze-pump-thaw. The degassed solution was then transferred to the flask containing the foam monolith via a gas-tight syringe. The reaction mixture was then placed in a 130° C. oil bath and stirred for 25 hours. The resulting polymer-grafted foam monolith was washed in a Soxhlet extractor for 24 hours using ethanol as the extraction solvent. The foam monolith was then dried overnight at 80° C. After polymerization, the foam weighted 0.3763 grams, which equaled a 599% weight gain. The foam monolith contained 76.76% carbon, 6.75% hydrogen, and 11.37% nitrogen. Referring to FIG. 4, an SEM of a sample foam monolith shows the polymeric chains (poly(4-vinylpyridine)) grafted at the edge of the pores formed in the open-celled polymeric foam.

Figure 8:
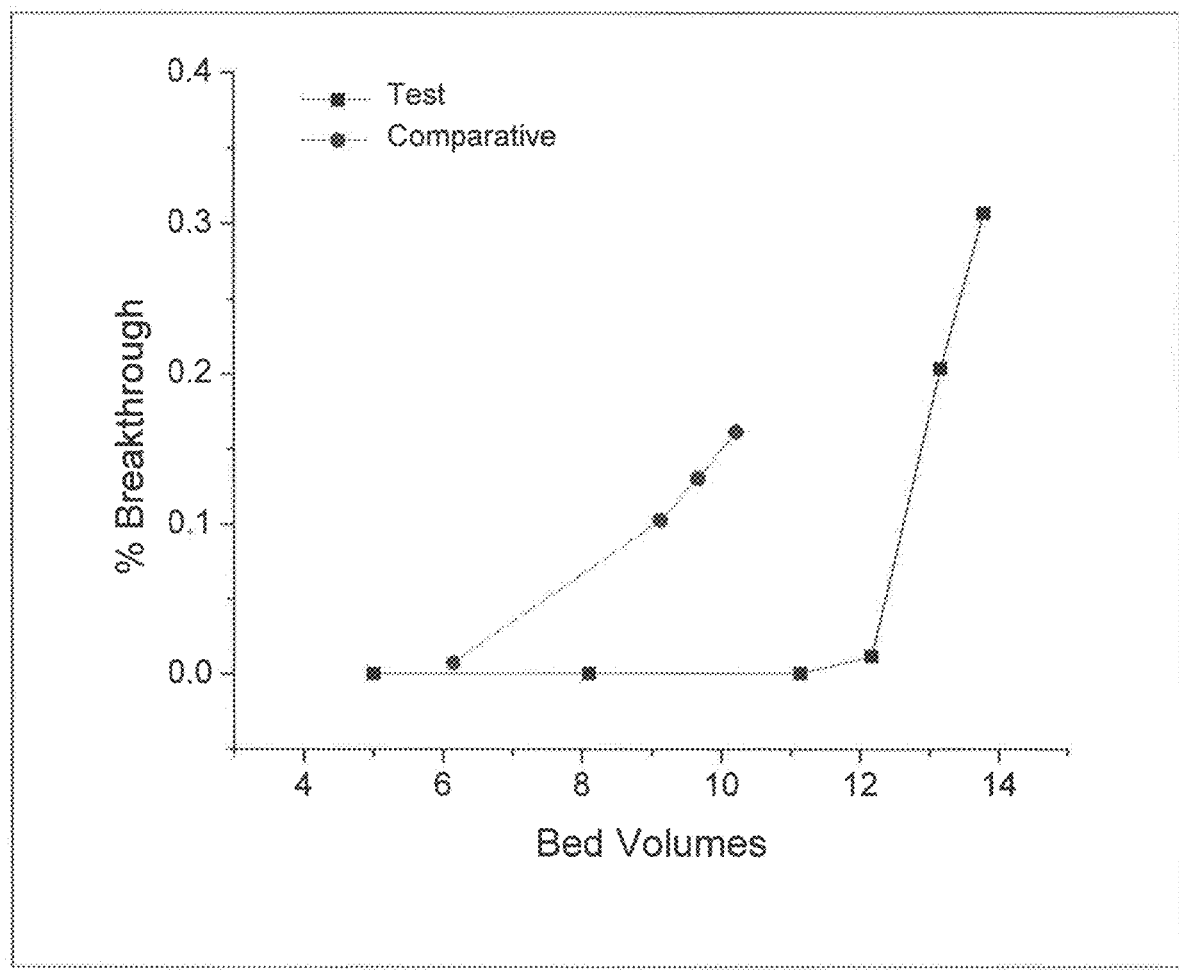
FIG. 8 is a graph comparing the plutonium loading characteristics of the high internal phase emulsion foam of a second example of the present invention with that of polymeric resin beads.
Figure 9:
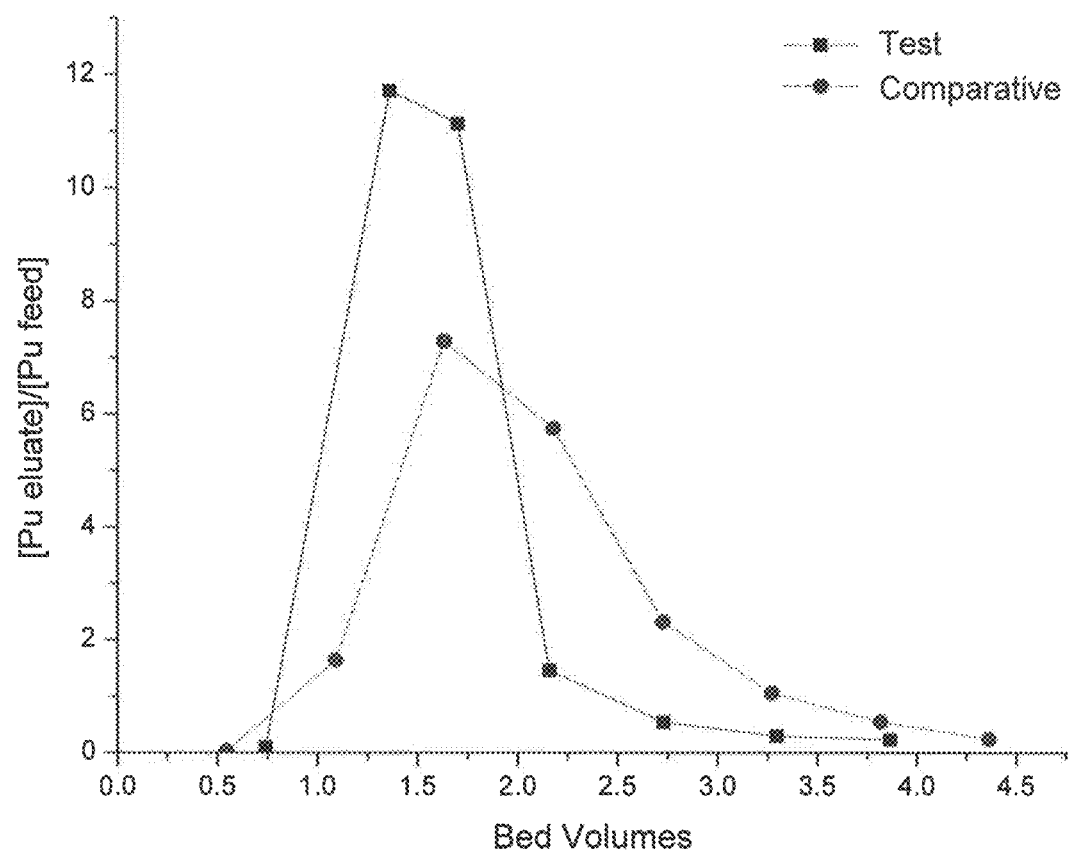
FIG. 9 is a graph comparing the elution characteristics of the high internal phase emulsion foam of a second example the present invention with that of polymeric resin beads.
Figure 10:
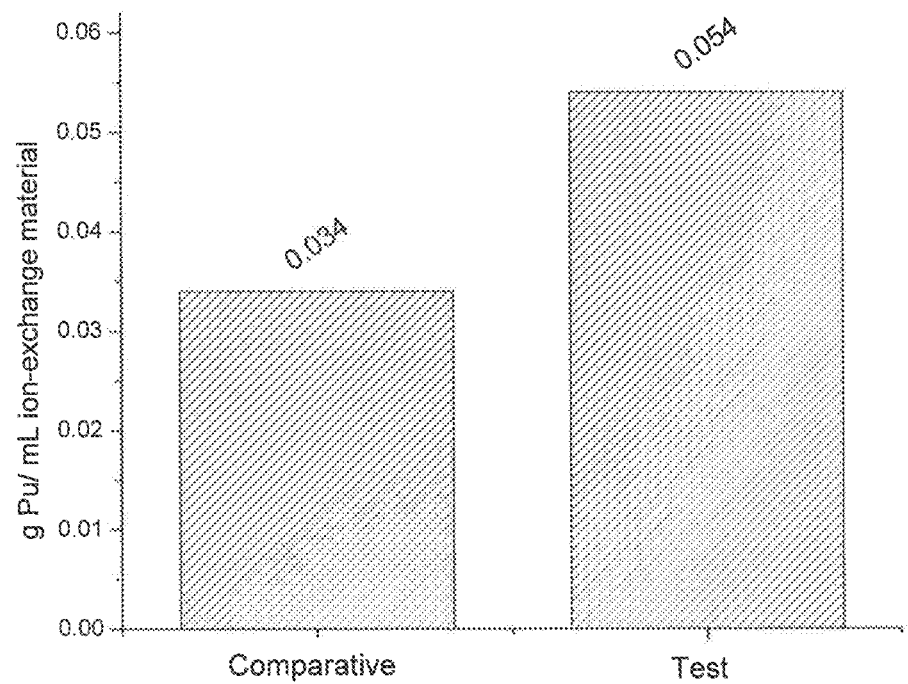
FIG. 10 is a bar graph comparing the grams of plutonium adsorbed per milliliter of ion exchange material for the high internal phase emulsion foam of the second example compared with that of polymeric resin beads.
Figure 11:
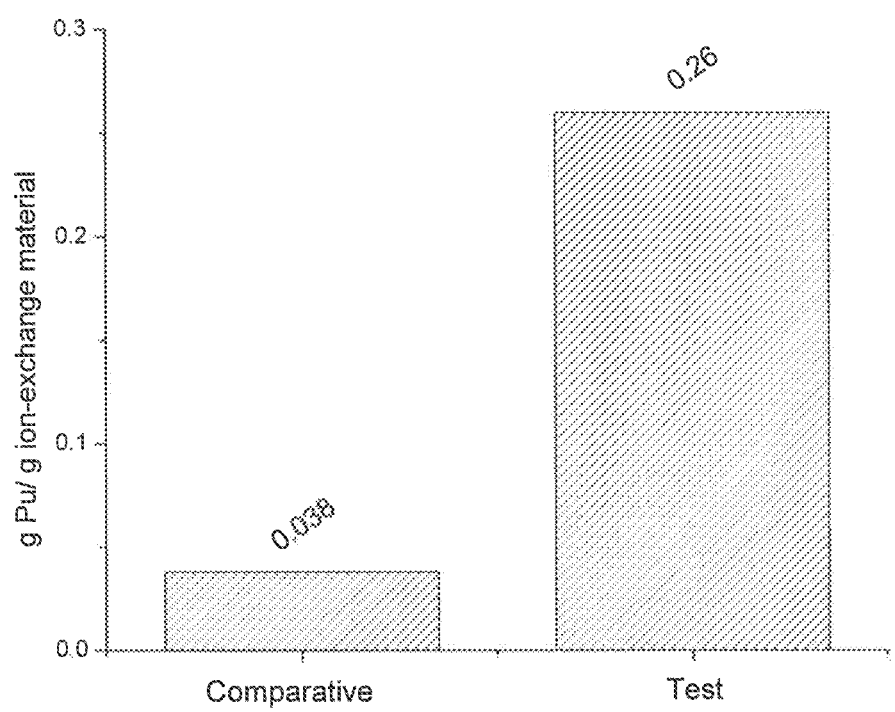
FIG. 11 is a bar graph comparing the grams of plutonium adsorbed per gram of ion exchange material for the high internal phase emulsion foam of the second example compared with that of polymeric resin beads.

Next, liquid chromatography column prototypes for flow testing were prepared by connecting the polymer-grafted foam monolith to hose connectors and sealing the assembly in four layers of high strength heat-shrink tubing. Then, the loading and elution characteristics of the polymer-grafted foam monolith of the present invention were investigated and compared to a column formed from resin beads (Reillex® HPQ resin) using an about 4 gram/liter feed solution of plutonium present as $[Pu(NO_3)_6]^{2-}$ in about 8 M nitric acid. As shown in FIG. 8, the column containing the polymer-grafted foam monolith of the present invention had higher plutonium uptake capacity as a function of bed volume compared to the commonly used industrial resin Reillex® HPQ. Moreover, as shown in FIG. 9, the polymer-grafted foam monolith of the present invention showed better elution characteristics than the resin. Specifically, a narrow elution profile was observed, and the concentration of the eluate reached greater than ten times the concentration of the feed for the polymer-grafted foam monolith of the present invention. In other words, the ability to recover the plutonium from the polymer-grafted foam monolith of the present invention required only required about 2.5 bed volumes of solvent, while 4.5 bed volumes of solvent were required to recover the plutonium from the resin beads, meaning that it requires less solvent and is more efficient to remove the material adsorbed onto to the polymer-grafted foam monolith of the present invention compared to the resin beads. In addition and referring to FIG. 10, based on weight, the polymer-grafted foam monolith of the present invention was able to absorb 0.054 grams of plutonium per milliliter of ion-exchange material, while the Reillex® HPQ resin was only able to absorb 0.034 grams of plutonium per milliliter of ion-exchange material. Further, referring to FIG. 11, based on weight, the polymer-grafted foam monolith of the present invention was able to absorb 0.26 grams of plutonium per gram of foam, while the Reillex® HPQ resin was only able to absorb 0.038 grams of plutonium per gram of resin.

Example 3

A surface-grafted high internal phase emulsion (HIPS) foam was formed according the methods contemplated by the present invention.

First, and referring to FIG. 1, a high internal phase emulsion foam functionalized with a nitroxide-mediated polymerization (NMP) agent was formed from an emulsion containing a continuous oil phase and an internal aqueous phase. The oil phase included the co-monomers of styrene (0.44 grams), divinyl benzene (0.275 grams, acting as a cross-linking agent), and TEMPO-styrene (0.385 grams), as well as a sorbitan monooleate (SPAN 80) surfactant (0.561 grams). The components of the oil phase were added to a small resin kettle equipped with a glass paddle stirrer. The aqueous phase included water (11.0 grams) and potassium persulfate ($K_2S_2O_8$) (0.150 grams) and was combined separately from the oil phase and was added slowly to the stirring oil phase (350 rpm) via a dropwise addition funnel for a period of about 15 minutes. The resulting emulsion was deposited into prepared glass tubing with one sealed end and was cured overnight in an 80° C. oven. The cured foam monoliths were then removed from the glass tubing by breaking the glass tubing, after which the foam monoliths were washed in a Soxhlet extractor for 24 hours using ethanol as the extraction solvent. The foam monoliths were then dried overnight at 80° C. and stored in plastic until use in the next step. The foam monoliths contained 80.48% carbon, 7.75% hydrogen, and 1.49% nitrogen. Referring to FIG. 2, an SEM image of a sample foam monolith shows the pores formed in the resulting open-celled polymeric foam.

Next, and referring to FIG. 3, to perform the surface-initiated nitroxide-mediated polymerization, 0.0432 grams of the high internal phase emulsion foam monolith formed as shown in FIGS. 1 and 2 was placed in a Schlenk flask with a magnetic stir bar. The flask was sealed and then deoxygenated by sparging with nitrogen ($N_2$) for 20 minutes. After the monolith was sparged, a mixture of 4 g of sodium 4-vinylbenzesulfonate dissolved in 25 mL dimethylsulfoxide was added to the flask via syringe, and the liquid was sparged with nitrogen for 25 minutes. The reaction mixture was then placed in a 130° C. oil bath and stirred for 25 hours. The resulting polymer-grafted foam monolith was washed in a Soxhlet extractor for 24 hours using water as the extraction solvent. The foam monolith was then dried overnight at 100° C. After polymerization, the foam weighted 0.086 grams, which equaled a 100% weight gain. The foam monolith contained 40.63% carbon, 4.54% hydrogen, 18.30% sulfur, and 1.06% nitrogen.

These and other modifications and variations to the present invention may be practiced by those of ordinary skill in the art, without departing from the spirit and scope of the present invention, which is more particularly set forth in the appended claims. In addition, it should be understood the aspects of the various embodiments may be interchanged both in whole or in part. Furthermore, those of ordinary skill in the art will appreciate that the foregoing description is by way of example only, and is not intended to limit the invention so further described in the appended claims.

What is claimed:

1. A method of forming a high internal phase emulsion foam, the method comprising:

forming a high internal phase emulsion comprising an oil phase and an aqueous phase, wherein the oil phase comprises a first monomer comprising a nitroxide-containing co-monomer, a second monomer comprising 4-vinylpyridine, and a crosslinking agent, wherein the oil phase comprises from about 5 wt. % to about 20 wt. % of the total weight of the high internal phase emulsion, wherein the nitroxide-containing co-monomer is present in the oil phase in an amount from about 15 wt. % to about 50 wt. % based on the total weight of the oil phase, and the aqueous phase comprises from about 80 wt. % to about 95 wt. % of the total weight of the high internal phase emulsion;

curing the high internal phase emulsion to form a high internal phase emulsion foam, the high internal phase emulsion foam including the first monomer in a backbone of the high internal phase emulsion foam; and following formation of the high internal phase emulsion foam, polymerizing a plurality of the second monomer via graft polymerization from a surface of the high internal phase emulsion foam, wherein the first monomer controls the polymerization of the second monomer, resulting in the formation of polymer chains comprising the plurality of the second monomer grafted at the surface, the surface comprising pore walls of the high internal phase emulsion foam, such that the polymer chains extend into pores of the high internal phase emulsion foam.

2. The method of claim 1, wherein forming the high internal phase emulsion comprises blending the oil phase with the aqueous phase.

3. The method of claim 1, wherein the nitroxide-containing co-monomer has the following structure:

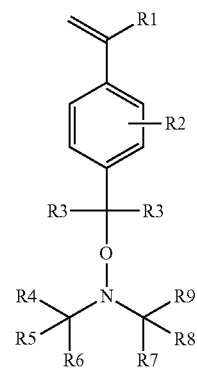

wherein R1 is H, $CH_3$, CN, or short alkyl;

wherein R2 is methyl, ethyl, alkoxy, halide, or nitrile (cyano);

wherein R3 is H, $CH_3$, $CH_2H_3$, short alkyl, phenyl, substituted phenyl, heteroaromatic, CN, or halide; and wherein R4-R9 are each independently a straight chain alkyl, a branched chain alkyl, a cycloalkyl, an arenyl group, a heterocyclic group, H phosphate, or phosphate ester, wherein each of R1-R9 are chosen to provide steric hindrance and weakening of the O—$CR3_2$ bond.

4. The method of claim 1, wherein the nitroxide-containing co-monomer has the following structure:

5. The method of claim 1, wherein the nitroxide-containing co-monomer has the following structure:

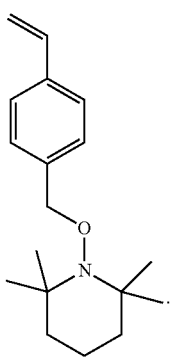

6. The method of claim 1, wherein the nitroxide-containing co-monomer has the following structure:

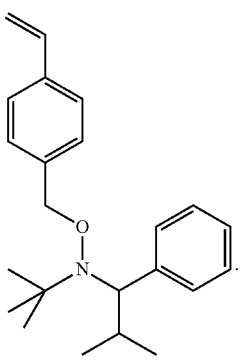 [SMILES: C=Cc1ccc(CON(C(c2ccccc2)C(C)C)C(C)(C)C)cc1]

7. The method of claim 1, wherein the second monomer is selected from the following classes of monomers: styrenics, acrylates, methacrylates, dienes, acrylamides, methacrylamides, vinyl esters, and vinyl pyridines.

8. The method of claim 1, wherein the cross-linking agent comprises divinyl benzene.

9. The method of claim 1, wherein the oil phase further comprises a surfactant.

10. The method of claim 1, wherein the oil phase further comprises an organic-soluble thermal initiator.

11. The method of claim 10, wherein the organic-soluble thermal initiator comprises azobisisobutyronitrile.

12. The method of claim 1, wherein the aqueous phase comprises water and a water-soluble thermal initiator.

13. The method of claim 12, wherein the water-soluble thermal initiator comprises potassium persulfate.

14. The method of claim 1, wherein the step of graft polymerizing the plurality of the second monomer from the surface of the high internal phase emulsion foam comprises soaking the high internal phase emulsion foam in a solution containing the second monomer and a solvent.

15. The method of claim 1, wherein the second monomer comprises 4-vinylpyridine.

16. The method of claim 14, wherein the solvent comprises butanol, methanol, ethanol, propanol, isopropanol, dimethyl sulfoxide (DMSO), N,N-dimethylformamide (DMF), water, or a combination thereof.

17. The method of claim 2, wherein the high internal phase emulsion is cured at a temperature below a temperature at which the nitroxide-containing co-monomer is activated.

18. The method of claim 1, wherein the high internal phase emulsion foam is cured at a temperature less than 90° C. prior to the step of graft polymerizing the second monomer from the surface of the high internal phase emulsion foam, and wherein the step of graft polymerizing the monomer from the surface of the high internal phase emulsion foam is carried out at a temperature ranging from about 95° C. to about 160° C., which is a temperature above a temperature at which the nitroxide-containing co-monomer is activated.

19. The method of claim 1, wherein the high internal phase emulsion foam adsorbs at least about 0.075 grams of metal ions or metal complexes per gram of the high internal phase emulsion foam.

20. A stationary phase for a liquid chromatography column, wherein the stationary phase comprises the high internal phase emulsion foam of claim 1.

21. The stationary phase of claim 20, wherein the second monomer is selected from the following classes of monomers: styrenics, acrylates, methacrylates, dienes, acrylamides, methacrylamides, vinyl esters, and vinyl pyridines.

22. A liquid chromatography column, the liquid chromatography column comprising:
a first connector;
a second connector;
a tube disposed between the first connector and the second connector; and
a stationary phase disposed within the tube, wherein the stationary phase comprises the high internal phase emulsion foam of claim 1.

* * * * *